Dec. 13, 1966  A. S. NORCROSS  3,290,923

VISCOSIMETER CONTROL APPARATUS

Filed Feb. 14, 1964

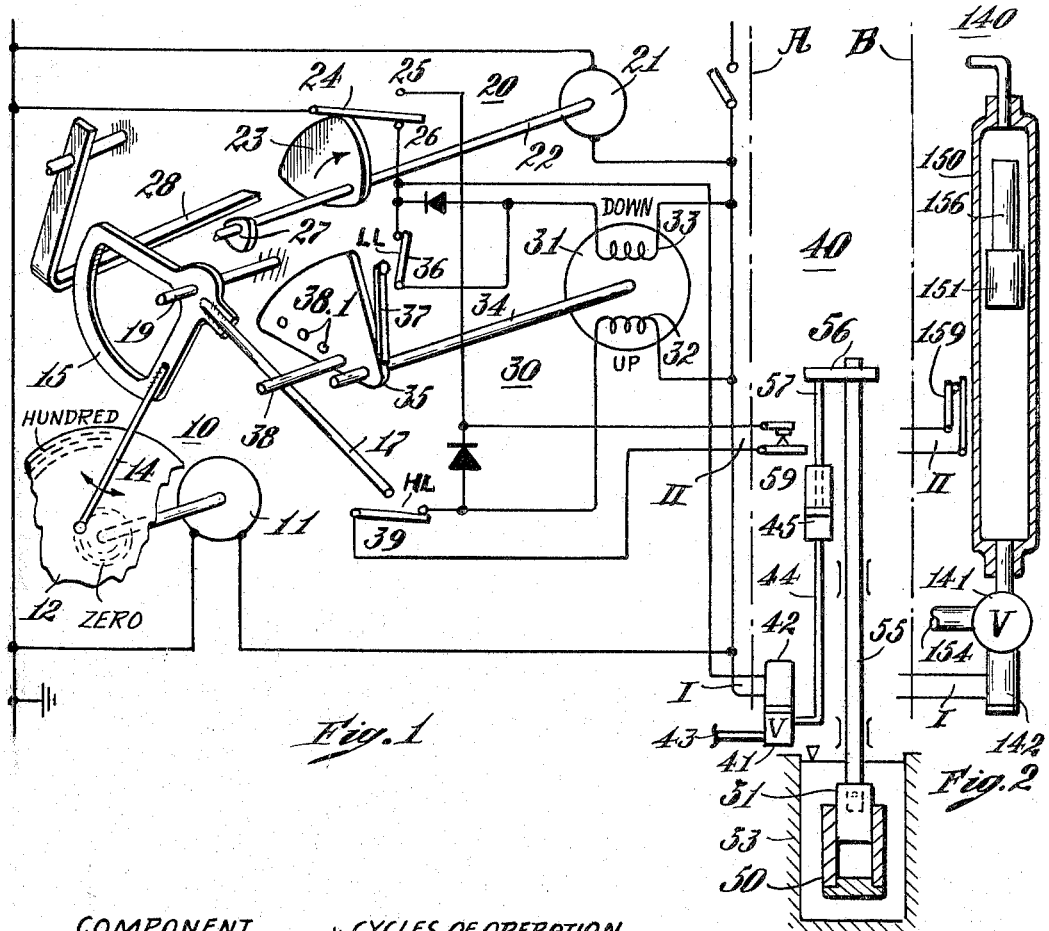

Fig. 1

Fig. 2

| COMPONENT | CYCLES OF OPERATION | | |
|---|---|---|---|
| CHART MOTOR 11 | RUNS CONTINUOUSLY | | NEXT CYCLE |
| TIMER MOTOR 21 | RUNS CONTINUOUSLY | | |
| TIMER {CONTACT 25 | OPEN | CLOSED | |
| {CONTACT 26 | CLOSED FOR 30" | OPEN | |
| VALVE 41 OR 141 | OPEN | CLOSED OR CONSTRICTED | |
| MEASURING MOTOR 31 | RUNS ↻ \| STOPS | RUNS ↺ \| STOPS | |
| LOW LIM. SWITCH 36 | CLOSED \| OPENS | | |
| HIGH LIM. SWITCH 39 | CLOSED | | OPENS IF PEN FULL UP |
| PISTON 51 | RAISING | FALLING | |
| SWITCH 59 OR 159 | CLOSED | OPENS | |
| PEN 14 | LAST READ'G. | UP, OR FALLING | |
| CLUTCH/BRAKE 15, 28 | IN | | OUT |

Fig. 3

INVENTOR.

Austin S. Norcross

BY Roberts, Cushman & Grover

ATT'YS.

United States Patent Office 3,290,923
Patented Dec. 13, 1966

3,290,923
VISCOSIMETER CONTROL APPARATUS
Austin S. Norcross, % Norcross Corp., 247
Newtonville Ave., Newton, Mass.
Filed Feb. 14, 1964, Ser. No. 344,893
10 Claims. (Cl. 73—57)

The field of this invention is that of the detection and indication of the viscosity of fluids during cyclically continuous sampling. More particularly the invention relates to control apparatus which correlates the viscosity detecting and indicating components of viscosimeters of this general type.

It has heretofore been proposed to measure the viscosity of fluids by forcibly flowing fluid samples through a restricted orifice, by measuring the time duration of such flows and by transforming the time durations of flows of individual samples into signals, the time durations of which are functions of each successive sample flowing test. Various techniques of this general type have been proposed and in my Patent No. 2,491,389 of December 13, 1949, I have disclosed a successful system of viscosity testing by way of providing the above-mentioned restricted orifice, effective during a measured time, by the space between a vessel and a solid body falling through the liquid sample therein, the time durations of falling being transformed into electric signals each of which is a function of successive viscosity values of the sampled fluid stream. In the system according to this patent, the falling body is cyclically lifted by external means which may be mechanically, hydraulically, pneumatically, or electrically actuated. In my copending application Ser. No. 344,892 of February 14, 1964, a different and in many instances preferable manner of cyclically moving a body against a biasing force such as gravity, is described; this system utilizes the fluid to be tested itself for moving, such as lifting, the detecting body, and provides for cyclic testing of continuously flowing fluids. Regardless of the body moving and flow techniques used, these systems have in common detecting stations or components with the cyclically reciprocating body, and indicating and often also recording stations or components. These components must be interconencted for programming the body cycle as well as the indication and recordation of the cyclic pulses whose duration is a measure of viscosity.

Objects of this invention are to provide systems of the above type wherein the detection stations and the indicating stations are interconnected by an optimally effective, rugged and yet comparatively inexpensive link; to provide such a system wherein detecting and indicating components of various types can be linked in the same manner; to provide such a system the circuitry of which is simple and reliable and links the detecting and indicating components in a manner which is unusually simple to wire, involves little chance for error in wiring during installation, and which is easy to explain for maintenance; to provide such a system which has a minimal number of connecting wires between the detecting and indicating components; and to provide, generally speaking, a viscosimeter system of this type which is adaptable to varying conditions including detecting components of different types but having in common elements required by the linking circuitry according to the invention, the system as a whole containing a minimum of mechanical as well as electrical impedances detrimental to the accuracy, reliability and durability expected of such systems under sometimes adverse conditions.

The substance of the invention can be briefly summarized as involving the electrical correlation of two distinct and more or less remotely located viscosimeter components or stations, namely a detecting component and an indicating component. The detecting component has single line electrically controlled means, such as a valve, for cyclically retracting and advancing a viscosity detecting body through a fluid sample, and single throw switch means responsive to a predetermined measuring position of the advancing body. The indicating component has a timer with a drive for cyclically moving an indicator to a viscosity indicating position and back to restored position. These components or stations are correlated by two single line electrical links, one between the body cycling means of the detecting station and the timing device of the indicating station, and a second single line link between the single throw switch means of the detecting station and the timing drive of the indicating station causing the indicator to stop when the body has arrived at the measuring position.

In another aspect of the invention, the timer of the indicating component has direction control means, such as a motor coil, for driving the indicator in measuring direction, in series with a normally closed high level switch, and this timer has also, in series with direction control means for driving in restoring direction, a normally closed low level switch.

In this manner, the detecting and recording stations, respectively, can be linked in the most simple manner by two single lines, one for controlling the movement of the body, and the other for determining the indicator movement. Also, this distribution of circuit elements allocates a minimum number thereof of optimally simple type, at the detecting station which in many instances should be as uncomplicated as possible.

These and other objects, advantages and inventive aspects of the substance of the invention, together with details of preferred construction thereof will appear from the following description of its principles, mode of operation, and of two embodiment illustrating its novel characteristics.

The description refers to a drawing in which

FIG. 1 is a schematical representation of a viscosimeter system complete with detecting and indicating stations correlated according to invention and incorporating a mechanical lifting device for the viscosity detecting falling body;

FIG. 2 represents a body lifting device different from that of FIG. 1 but suitable for correlation with an indicating component identical to that of FIG. 1, with identical linking wires, that part of FIG. 1 which is at the left-hand side of the dot and dash line A being by reference incorporated on the lefthand side of the dot and dash line B of FIG. 2; and FIG. 3 is a cycle of operation chart indicating the operation of apparatus according to FIGS. 1 and 2, this chart incorporating and referring to the functions of the essential elements of both FIGS. 1 and 2.

The indicating component to the left of line A which is common to FIGS. 1 and 2, has a chart unit 10 with a motor 11 for driving a chart 12 of conventional circular configuration. An indicator such as recording pen 14 is mounted on a clutch and brake segment 15 rotatably mounted on a fixed shaft 19. The segment 15 also has attached thereto a pen actuating follower 17 which is also capable of opening the normally closed full scale limit switch 39, also referred to as high limit switch, as will be described hereinbelow.

A timer unit 20 has a timer motor 21 conveniently supplied from the same power line as the chart motor 11 and driving, by means of shaft 22, a cam 23 arranged to transfer during a predetermined period, beginning with a given angular position thereof, the contact or timer switch arm 24 from normally closed position on contact 26 to operating position on contact 25. The shaft 22 also carries a clutch operating cam or similar instrumentality indicated at 27 capable of lifting in a predetermined angular position at the end of each measuring cycle, the brake and clutch arm 28 from the segment 15, for the purpose of momentarily releasing the clutch to allow the pen to return, by gravity, spring or other biasing, to a lower position unless it is held by the pin 38, as will be described below.

A measuring unit 30 has a measuring motor 31 of the type which can be selectively operated in either direction by means of separate windings here designated as up-winding 32 and as down-winding 33. The motor 31 drives a shaft 34 which carries a range selector plate 35 with a switch operator 37 which in a given angular position of the plate opens a normally closed low limit switch 36, in the circuit of the down-winding 33 in series with the normally closed contacts 24, 26. An actuator pin 38 for operating the above-mentioned follower 17 can be placed in various range selecting positions upon the range selector plate 35, as indicated by perforations 38.1 for placing the pin 38 at various radii from the shaft 34 to move the follower 17 at preselected speeds. As indicated in FIG. 1, the switches which control the windings of motor 31 are bridged by rectifiers in well-known manner to stop this motor quickly by energizing the corresponding winding with direct current. The measuring motor 31 is capable of lifting the pen 14 by way of the pin 38, against the frictional torque applied by the brake and clutch arm 28 to the segment 15. This frictional torque between segment 15 and arm 28, while it can be overcome by the torque exerted by the measuring motor, is capable of holding the pen in viscosity indicating position, until the next measurement lowers or raises its reading, as will be described below. The so-called high limit switch 39 stops the measuring motor by energizing the up-coil 32 with direct current, when the pen has reached full scale such as "hundred" reading, in order to prevent over-running. It should be understood that the designations "up-coil" and "down-coil" for 32, 33, respectively, refer to gravity biasing of plate 35 and segment 15, and hence to up and down movement of the pen.

The detecting component or station 40 shown in FIG. 1 to the right of line A has a fluid measuring receptacle 50 containing a piston 51 fitting it with a predetermined viscosity responsive clearance. Fluid samples whose viscosity is to be measured can be periodically changed in the vessel 50 by any convenient means such as indicated by the container 53 from which liquid is admitted into and removed from the vessel 50 through the space between receptacle 50 and piston 51. The piston rod 55, appropriately guided as indicated, has at its top a lifting and switch operating head 56 by means of which the piston rod can be lifted by way of a push rod 57 which is part of a pneumatic gear of conventional construction comprising a solenoid valve 41 operated by a magnet 42, an air supply 43 and an air duct 44 leading to the piston rod operating air cylinder 45. A normally closed circuit breaker 59 serving as a measuring switch, is arranged adjacent to head 56 which opens it upon descending. When air is supplied during energization of solenoid valve 41, 42, the piston rod is raised to a predetermined height. Upon reverse operation of the pneumatic control system, the push rod 57 drops quickly allowing the piston assembly 51, 55 and 56 to fall by gravity until the head 56 opens switch 59 terminating the period of energization of coil 32 which period corresponds to the falling time of the piston which is a measure of viscosity.

Another embodiment of the detecting station, involving somewhat modified circuitry elements which however fit the linking circuitry without modification thereof, will now be described with reference to FIG. 2. A practical embodiment of a detecting component of this type numbered 140 is fully described in my above-identified copending application. In FIG. 2, numeral 150 designates a container having fluid supply ports at the top and bottom and containing a measuring body or piston 151 carrying an actuating magnet 156. The lower part is adjacent to a body lifting control valve 141. Upon opening of this control valve, actuated by solenoid 142, fluid whose viscosity is to be measured is admitted from duct 154 and lifts the piston 151 until the valve is again fully or partly closed by operation of the indicating component and the linking circuitry as will be described below. Upon descending, the magnet 156 opens a circuit breaker such as the normally closed measuring proximity switch 159. It will be noted that the piston is freely lifted by the fluid to be measured, through which it descends during a following part of the cycle for purposes of viscosity measuring in terms of the duration of the descending period from the highest position of the piston until it reaches the proximity switch 159.

As more fully described in my copending application, continuous flow at station 140 can be maintained by slowing down the fluid during the measuring periods of the cycles when the body is forced through the fluid by a biasing force such as gravity. Continuous flow measuring can also be carried out with a detecting station according to 40, with appropriate modifications.

The operation is comprehensively set forth in FIG. 3 which applies to both FIGS. 1 and 2 and needs little further explanation beyond the following comments pertaining particularly to the circuitry according to the present invention.

Assuming that the apparatus is in the condition at the beginning of the period charted in FIG. 2, the body cycling means which includes motors 21 and 31 with the switches pertaining thereto, causes the measuring piston 51 to rise and the measuring motor 31 with plate 35 to return to initial position, with valve 41 held open by 42 and the timer switch contacts 24, 26 closed. When the timing means 20 transfers contact 24 to 25, the body falling period begins, initiated through linkage I closing valve 41. The upwinding controlled measuring motor 31 rotates pin 38 in the opposite direction until the piston reaches a predetermined lower position, where the operating head 56 opens the measuring switch 59 and by way of link II the motor 31 is stopped, here by energizing coil 32 with direct current by the effect of the rectifier across open switch 59. Assuming first that the preceding viscosity measurement was lower, the pin 38 abuts, during the measuring period while motor 31 is running; the follower 17 which in turn rotates the segment 15 with pen 14. As indicated above, the driving torque of the segment 15 overcomes the frictional torque applied by the brake arm 28 and the pen 14 advances on the chart to the value corresponding to the viscosity of the sample just having been measured. Assuming on the other hand that the preceding viscosity measurement was higher and the pin 38 has not advanced as far as during the preceding cycle, the segment 15 is permitted to rotate towards a lower reading of the pen at the end of the measuring cycle when cam 27 momentarily releases the brake arm 28, as described above. It will now be evident that this lower reading is determined by the position of pin 38 at the time when the measuring motor is stopped by the opening of link II at the end of the measuring period. The low limit switch 36 opens at the end of the down movement of motor 31, stopping plate 35 in a position corresponding to zero indication of the pen if it were fully released. The high limit switch 39 opens when the pen is in uppermost, full scale position.

Recapitulating, it will now be apparent that the present invention is applied to a detecting station such as 40 or 140, more or less remote from an indicating station, with chart unit 10, timer unit 20 and measuring unit 30.

The detecting station has actuating means for advancing the measuring body 51 or 151 to a measuring position and for returning it to initial position. Such actuating means are for example the hydraulic lifting gear 41, 42, 45, 57 of FIG. 1 or the fluid lifting arrangement operated by valve 141, 142 according to FIG. 2. The detecting station has also a measuring circuit breaker, preferably a normally closed single pole switch 59 or 159, located for operation by the body at measuring position.

The indicating station has an indicator such as pen 14 and indicator moving means such as segment 15, follower 17 and plate 35 with pin 38, all driven by the measuring motor 31. The indicator moving means are normally held by indicator holding means such as brake-clutch 15, 28. A timer here motor 21, drives a switch means 24, 25, 26 for cyclically energizing such as by means of cam 23 and contacts 24, 25, the above-mentioned measuring body and fluid actuating means. A measuring motor means 31 is controlled by contacts 24, 26 of the timer and has first direction control means such as a coil 32 for rotating the motor and the pin 38 in the sense for lifting the pen upwardly to indicate or record viscosity values on the chart 12 driven by motor 11. A second direction control means such as coil 33 is capable, when energized through 24, 25 of rotating pin 38 in pen releasing or downward direction. Connected in series with the coil 32 is a normally closed high limit switch 39 which is opened by the follower 17 when the pen is in extreme upper position. In series with the up coil 32 and the high limit switch 39 is the above-mentioned measuring circuit breaker 59 or 159. In series with the down coil 33 and contacts 24, 26 is the normally closed low limit switch 36. Means for releasing the pen holding means 15, 28 are for example provided by the cam 27 on the timer shaft 22. Means for opening the high limit switch 39 are for example provided by the follower 17 which actuates 39 when the indicator pen reaches maximal position. Means for opening the low limit switch 36 are for example provided by the switch operator 37 of plate 35 which actuates 36 at the end of the restoring period.

It will further be apparent that connection of the high level switch 39 in series with the up coil 32, and of the low level switch 36 in series with the down coil 33 permit the use of single line links from the indicating station to measuring circuit breaker 59 or 159, and the measuring body and fluid actuating means 42 or 142, with the advantages set forth above.

It should be understood that the present disclosure is for the purpose of illustration only and that this invention includes all modifications and equivalents which fall within the scope of the appended claims.

I claim:

1. In viscosity measuring apparatus having a detecting station with a body arranged to perform a viscosity depending measuring movement between a restored position and a measuring position within a vessel carrying samples of the fluid to be measured, with electrically controlled body cycling means capable of periodically effecting movement between said positions, and with measuring switch means for transferring connection when the body has reached the measuring position, said apparatus further having an indicating station with timing means for actuating said body cycling means, and with indicating means including an actuator for starting said measuring movement of the body from the restored position, and electrically controlled means for stopping said indicating movement, the improvement which comprises:

first two wire electrical linking means for directly interconnecting said measuring switch means of the detecting station and said stopping means of the indicating station for terminating consecutive viscosity dependent movements of the body; and second two wire electrical linking means for directly interconnecting said body cycling means of the detecting station and said timing means of the indicating station for actuating the cycling means;

whereby the detecting and indicating stations, respectively, can be arranged remotely from, and related to, each other with a minimum of electric interconnection.

2. Apparatus according to claim 1, wherein said electrically controlled body cycling means includes mechanical body lifting means, and said measuring switch means is controlled by said mechanical lifting means.

3. Apparatus according to claim 1, wherein said electrically controlled body cycling means includes fluid control means for periodically admitting fluid below said body to lift it within said vessel and for thereupon letting said body fall freely within said vessel.

4. Apparatus according to claim 3 wherein said body carries electromagnetically remotely effective means and wherein said measuring switch means includes means affected by said remotely effective means upon passage in proximity thereof for transferring the switching means.

5. Apparatus according to claim 4 wherein said measuring switch means is normally closed and upon opening by the body in low position de-energizes said actuator of the indicating component for stopping said indicating means.

6. Apparatus according to claim 3 wherein said fluid control means includes a magnetically controlled valve.

7. Viscosity measuring apparatus of the type wherein a measuring body moves cyclically within a fluid stream flowing at different speeds, including zero, in corresponding periods of each cycle, comprising:

a detecting station including:
   remotely controlled actuating means for advancing the body to a measuring position through a cyclically changed fluid sample during measuring periods, and for returning the body to an initial, measurement starting position during restoring periods, of each cycle; and
   a single pole measuring circuit breaker located for operation by said body having arrived at said measuring position; and
an indicating station including:
   an indicator,
   indicator moving means having normally effective indicator holding means,
   a timer having single pole switch means for cyclically energizing said body actuating means through a two wire electric link,
   measuring motor means controlled by said timer, having first detection control means and a normally closed single pole high limit switch in series with said measuring circuit breaker through a two wire electric link for driving said indicator means during measuring periods, and having second direction control means and a normally closed low limit switch in series therewith for restoring said indicator moving means while said indicator is held by said indicator holding means during said restoring periods,
   means controlled by said timer for releasing said indicator holding means at the end of each measuring period,
   means actuated by said first direction control means for opening said high limit switch when the indicator reaches maximal position, and
   means actuated by said second direction control means for opening said low limit switch at the end of the restoring period.

8. Apparatus according to claim 7, wherein said measuring circuit breaker includes a magnetic operator associated with said body and magnetically responsive contact means adjacent said measuring position of the body, whereby the contact means is actuated by the operator when in proximity thereto in the measuring position.

9. Apparatus according to claim 7, wherein said remotely controlled actuating means for advancing and returning the body includes means for biasing the body and means for cyclically varying the speed of the fluid stream whereby the body is cyclically moved between said two positions.

10. Apparatus according to claim 9, wherein said speed varying means includes valve means for reducing the speed of, including stopping, the fluid.

References Cited by the Examiner
UNITED STATES PATENTS 2,491,389  12/1949  Norcross _____ 73—57

FOREIGN PATENTS 899,369  6/1962  Great Britain.

DAVID SCHONBERG, *Primary Examiner.*